United States Patent [19]
Dori

[11] Patent Number: 5,228,993
[45] Date of Patent: Jul. 20, 1993

[54] CLEANABLE FILTER SYSTEM WITH LONGITUDINALLY MOVABLE AND ROTATABLE CLEANING MEMBER

[76] Inventor: Mordeki Dori, P.O. Box 21538. Tel Aviv, Israel

[21] Appl. No.: 763,890

[22] Filed: Sep. 20, 1991

Related U.S. Application Data

[63] Continuation of Ser. No. 487,023, Feb. 9, 1990, abandoned.

[51] Int. Cl.$^5$ .............................................. B01D 25/38
[52] U.S. Cl. ...................... 210/332; 55/294; 210/107; 210/333.01; 210/346; 210/413
[58] Field of Search ........... 134/144, 152, 172; 210/107, 108, 333.01, 333.1, 411, 413, 414, 323.1, 346, 486, 791, 798, 332; 55/294

[56] References Cited

U.S. PATENT DOCUMENTS

| | | | |
|---|---|---|---|
| Re. 32,537 | 11/1987 | Drori | 210/108 |
| 1,906,391 | 5/1933 | McKinley | 210/413 |
| 4,024,504 | 8/1977 | Drori | 210/107 |
| 4,271,018 | 6/1981 | Drori | 210/107 |
| 4,295,963 | 10/1981 | Drori | 210/108 |
| 4,552,655 | 11/1985 | Granot | 210/108 |
| 4,624,785 | 11/1986 | Drori | 210/414 |
| 4,655,911 | 4/1987 | Tabor | 210/107 |
| 4,714,552 | 12/1987 | Tabor | 210/333.01 |
| 4,762,615 | 8/1988 | Drori | 210/411 |
| 4,806,217 | 2/1989 | Rosenberg | 210/108 |
| 4,880,537 | 11/1989 | Drori | 210/323.1 |
| 4,906,357 | 3/1990 | Drori | 210/486 |
| 4,923,600 | 5/1990 | Krofta | 210/107 |
| 4,923,601 | 5/1990 | Drori | 210/107 |
| 4,935,126 | 6/1990 | Drori | 210/107 |
| 4,995,968 | 2/1991 | Snelling | 210/108 |
| 5,030,349 | 7/1991 | Drori | 210/486 |
| 5,074,999 | 12/1991 | Drori | 210/346 |
| 5,098,565 | 3/1992 | Drori | 210/346 |

*Primary Examiner*—Joseph W. Drodge
*Attorney, Agent, or Firm*—Browdy and Neimark

[57] ABSTRACT

A cleanable filter system including a housing defining an inlet for fluid to be filtered and an outlet for filtered fluid, a stack of filter disks disposed within the housing and defining an upstream surface communicating with the inlet and a downstream surface communicating with the outlet and filter disk cleaning apparatus including a plurality of nozzles coupled to a source of backflushing fluid and providing a high pressure stream of fluid impinging on the downstream surface, and apparatus for providing both linear and rotational motion of the plurality of nozzles relative to the downstream surface thereby to result in systematic scanning of generally all of the filter disks.

17 Claims, 11 Drawing Sheets

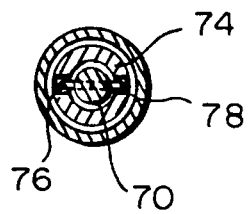
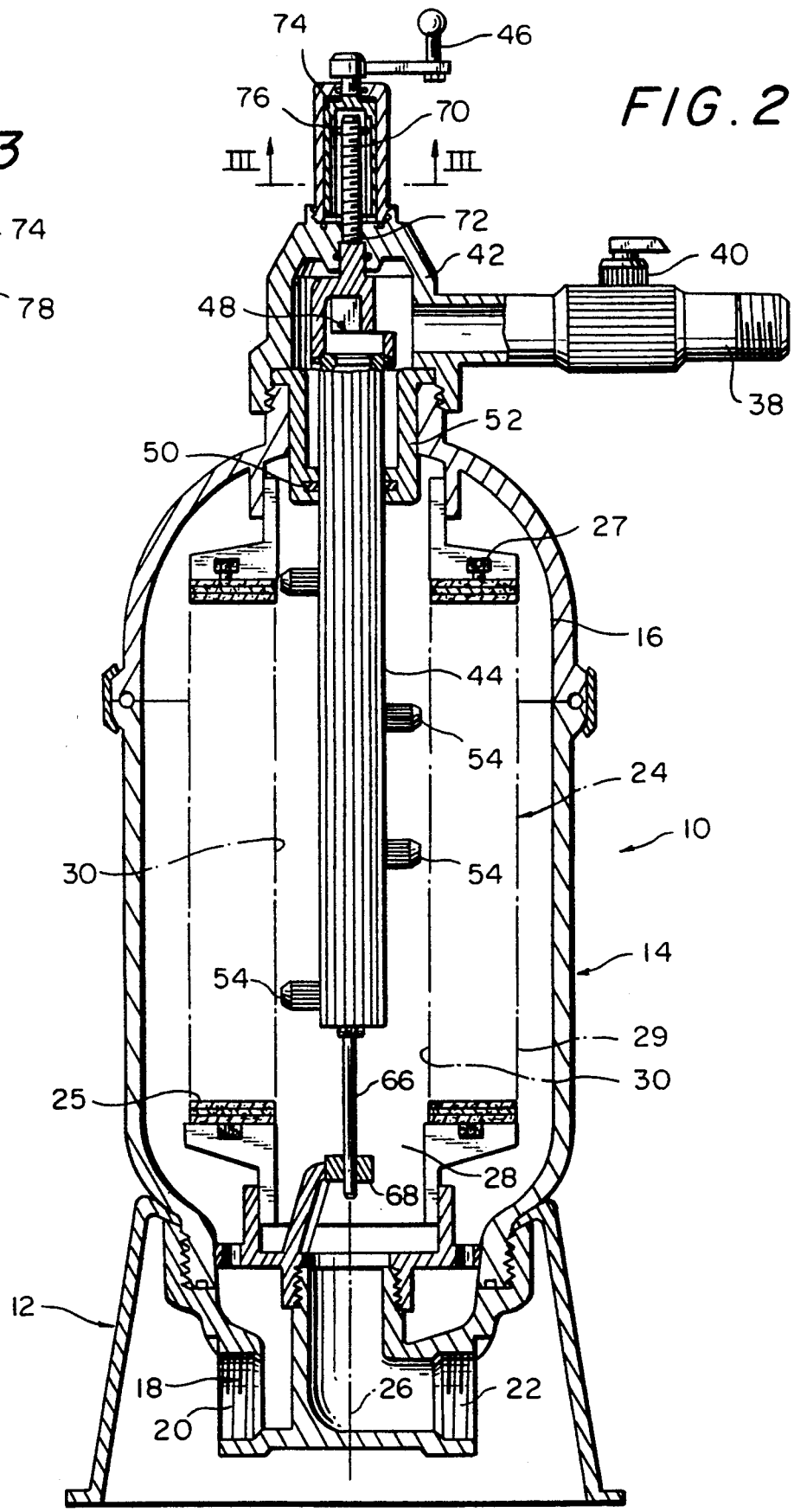

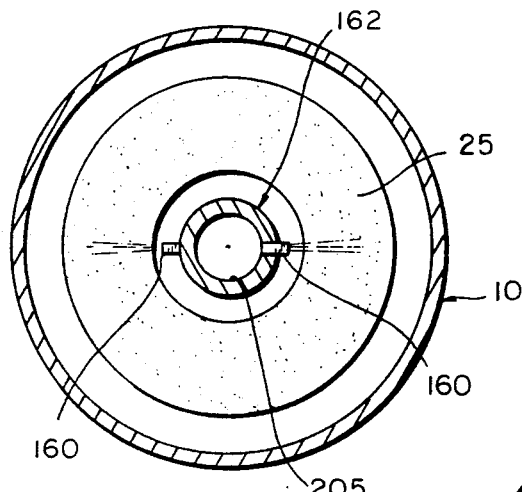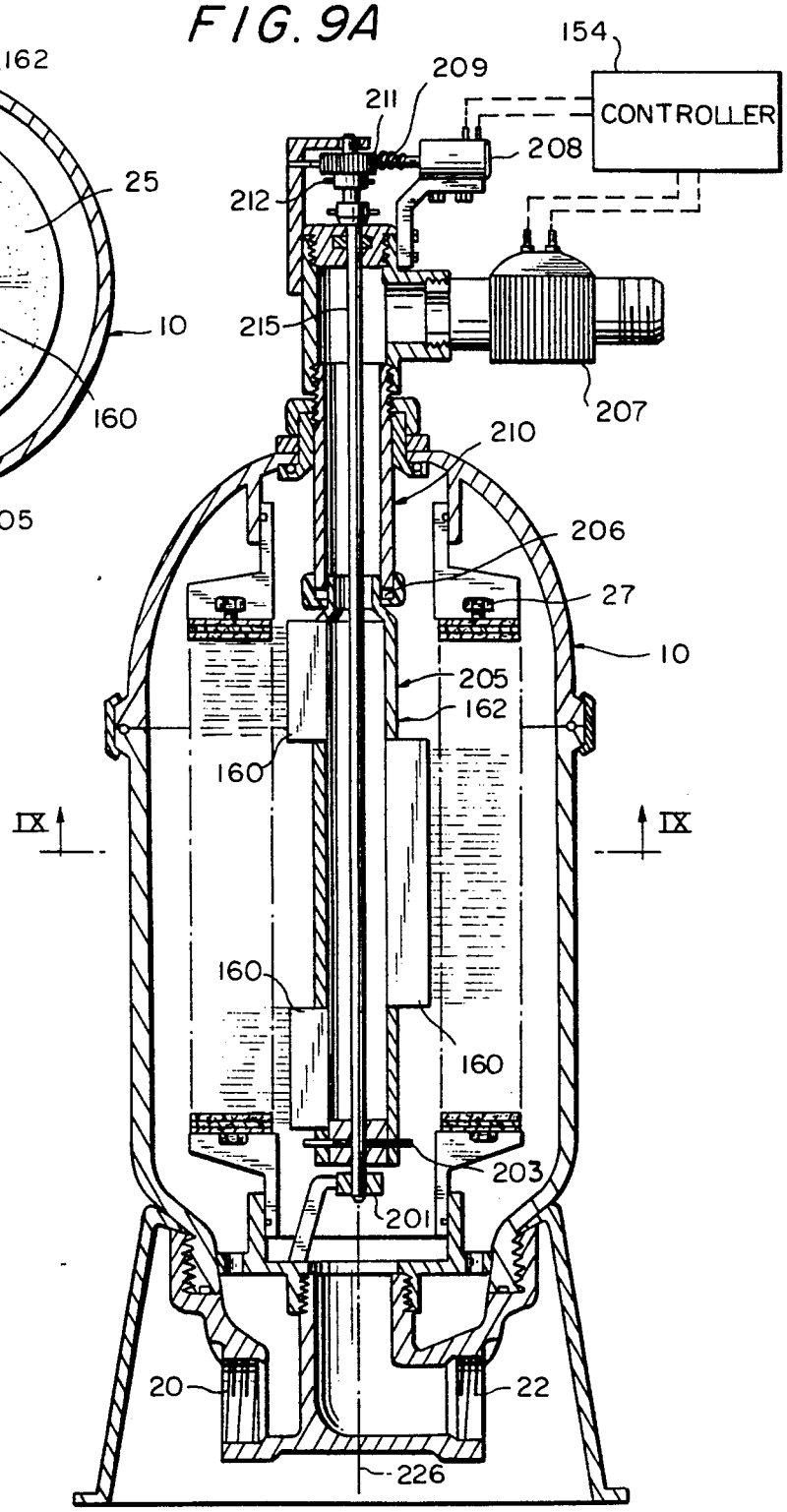

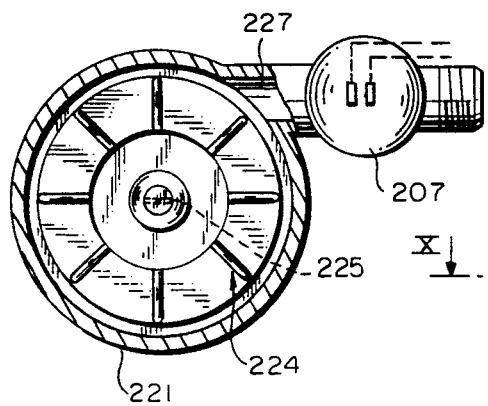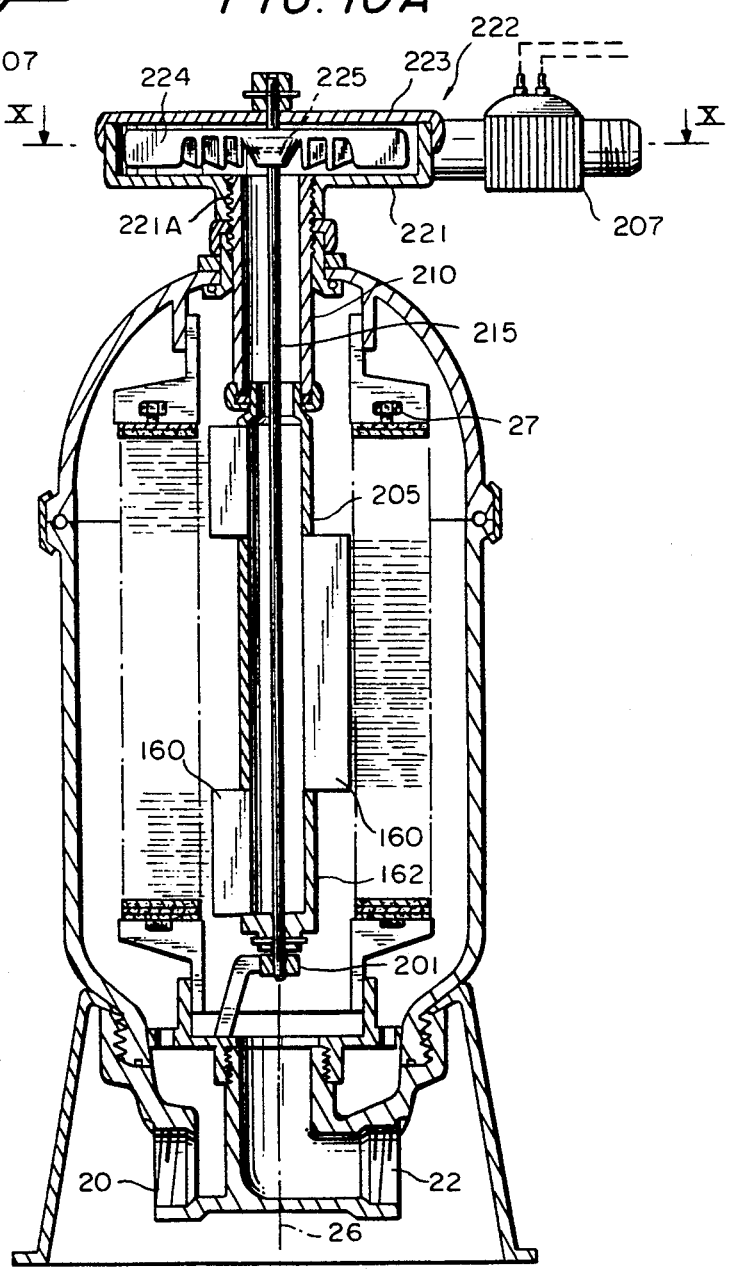

CLEANABLE FILTER SYSTEM WITH LONGITUDINALLY MOVABLE AND ROTATABLE CLEANING MEMBER

This application is a continuation of application Ser. No. 07/487,023, filed Feb. 9, 1990 now abandoned.

FIELD OF THE INVENTION

The present invention relates generally to fluid filters and more particularly to fluid filters of the cleanable disk type.

BACKGROUND OF THE INVENTION

Various types of fluid filters of the cleanable disk type are known in the patent literature. Examples of such filters and filter systems are described in applicant's U.S. patent application Ser. No. 07/150,246.

Filters having a water powered filter cleaning system are described and claimed in applicant's U.S. Reissued Patent 32,537 and in applicant's U.S. Pat. Nos. 4,045,345 and 4,614,581.

SUMMARY OF THE INVENTION

The present invention seeks to provide an improved filter system incorporating filter disks which are cleanable by backflushing.

There is thus provided in accordance with a preferred embodiment of the present invention a cleanable filter system including a housing defining an inlet for fluid to be filtered and an outlet for filtered fluid, a stack of filter disks disposed within the housing and defining an upstream surface communicating with the inlet and a downstream surface communicating with the outlet and filter disk cleaning apparatus including a plurality of nozzles coupled to a source of backflushing fluid and providing a high pressure stream of fluid impinging on the downstream surface, and apparatus for providing motion of the plurality of nozzles relative to the downstream surface thereby to result in systematic scanning of generally all of the filter disks.

Preferably, the stack of filter disks includes a generally cylindrical stack of annular disks wherein the upstream surface is defined by an outer cylindrical surface of the stack and the downstream surface is defined by an inner cylindrical surface of the stack.

According to an alternative embodiment of the invention, each of the plurality of nozzles defines an elongate nozzle outlet extending along a plurality of disks.

In accordance with one embodiment of the invention, the apparatus for providing motion includes apparatus for rotating and simultaneously translating a manifold onto which the plurality of nozzles are mounted about an axis of rotation which is also the axis of symmetry of the stack of disks.

The apparatus for rotating and simultaneously translating may be driven by a hand-operated crank or alternatively and preferably by an electric motor.

The simultaneous rotation and translation may be provided by any suitable mechanism, such as threaded engagement between the manifold and the housing.

According to a alternative embodiment of the present invention, the simultaneous rotation and translation may be provided by separate independent apparatus, such as a linear piston, providing the translation and a water powered rotating nozzle, providing the rotation. In such a case, the piston may be hand operated or alternatively and preferably powered, as by a fluidic driver.

Preferably, the operation of the apparatus for providing motion is coordinated with the supply of backflushing fluid to the plurality of nozzles.

BRIEF DESCRIPTION OF THE DRAWINGS

The present invention will be understood and appreciated more fully from the following detailed description, taken in conjunction with the drawings in which:

FIG. 2 is a partially cut away illustration of a fluid filter constructed and operative in accordance with another preferred embodiment of the invention having hand-crank operated backflush apparatus, shown in a raised orientation;

FIG. 3 is a sectional illustration taken at lines III—III of FIGS. 2, 7, 8A and 8B;

FIG. 9A is a partially cut away illustration of a fluid filter constructed and operative in accordance with another preferred embodiment of the invention, the nozzles having elongate openings;

FIG. 9B is a sectional illustration taken at lines IX—IX of FIG. 9A;

FIG. 10A is a partially cut away illustration of a fluid filter constructed and operative in accordance with yet another preferred embodiment of the invention, the nozzles having elongate openings; and FIG. 10B is a sectional illustration taken at lines X—X of FIG. 10A.

DETAILED DESCRIPTION OF PREFERRED EMBODIMENTS

Figure 1:
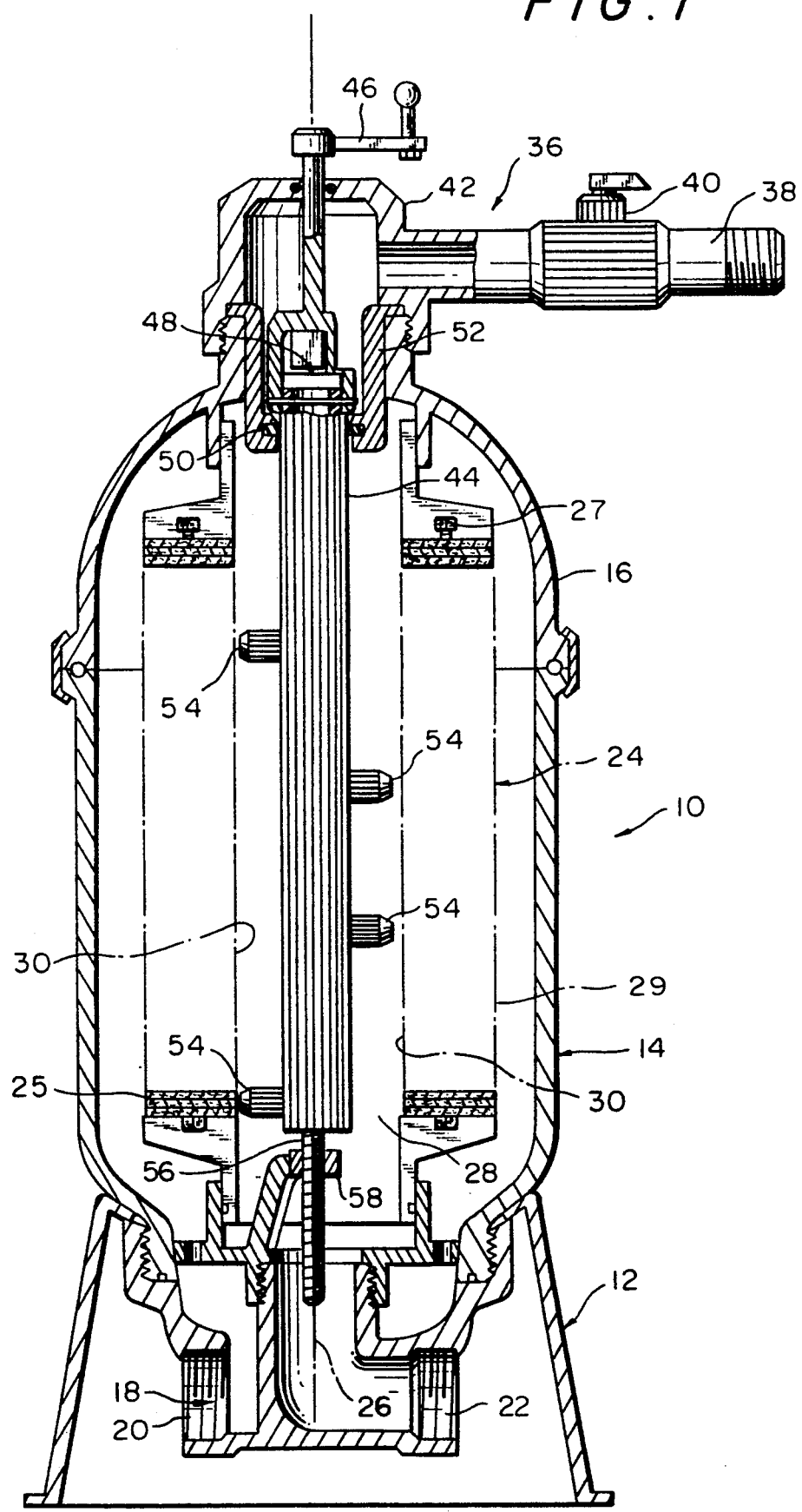
FIG. 1 is a partially cut away illustration of a fluid filter constructed and operative in accordance with a preferred embodiment of the invention having hand-crank operated backflush apparatus, shown in a lowered orientation.

Reference is now made to FIG. 1, which illustrates a filter system constructed and operative in accordance with a preferred embodiment of the present invention. The filter system typically comprises a housing 10, including a base portion 12, a bottom portion 14 and a top portion 16. An inlet and outlet manifold 18 communicates with the interior of the housing 10 and defines an inlet 20 for fluid, such as water, to be filtered and an outlet 22 for filtered fluid.

A generally cylindrical stack 24 of filter disks 25 is disposed inside the housing 10 and defines a central longitudinal opening 28. The disks are held together by any suitable means, as by a screw arrangement 27. The stack 24 is located about an axis of symmetry 26 defined with respect to the housing 10. The stack 24 defines an upstream cylindrical surface 29 which communicates with the fluid to be filtered supplied through the inlet 20 and a downstream cylindrical surface 30 surrounding central longitudinal opening 28, which communicates with the outlet 22.

The general configuration and construction of the filter to the extent described so far, is described in one or both of the following copending patent applications of applicant, the teachings of which are hereby incorporated by reference: U.S. Ser. Nos. 07/013,248; 07/150,246.

In accordance with a preferred embodiment of the present invention, there is providing a filter cleaning assembly including a backflush fluid supply assembly 36. Assembly 36 comprises a supply pipe 38 for receiving a backflush fluid, such as water, under pressure from a suitable source, not shown, a manually actuable valve 40 for controlling the supply of backflush fluid along supply pipe 38 and a sealed collar member 42, which threadably and sealingly engages the top portion of housing 10.

A manifold 44 is mounted preferably for rotation about axis 26 and is arranged to be driven in rotation by a hand crank 46. The backflush fluid enters the manifold 44 under pressure through an opening 48 at the top thereof, which communicates with the interior of collar member 42 and is sealed from the interior of the housing 10 by means of a sealing ring 50 mounted onto a seal support collar 52, which is sealingly held in place between the collar member 42 and housing portion 16.

In fluid communication with the interior of manifold 44 are a plurality of nozzles 54, each preferably having a nozzle outlet whose cross sectional height is at least equal to the pitch of rotation of the nozzle. i.e. the axial component of motion which takes place during a 360 degree rotation of the nozzle. The dimensions of each outlet are preferably small relative to the interior of the cleaning assembly, thereby accelerating the flow of fluid through the outlets.

A multiplicity of generally radially extending fluid flow passageways are defined by the stack 24 of filter disks, as they appear at the downstream surface 30. The configurations of the passageways and of the nozzle outlets are described in detail in applicant's copending U.S. patent application Ser. No. 07/150,246, the teachings of which are hereby incorporated by reference.

Extending downwardly from manifold 44 and fixed thereto is a threaded rod 56, which threadingly engages a nut 58, fixedly mounted with respect to the housing 10. It is appreciated that rotation of the manifold 44 and of threaded rod 56 about axis 26 in threaded engagement with fixed nut 58 causes the threaded rod and thus manifold 44 to undergo longitudinal movement along axis 26 as a function of the amount of rotation, determined by the pitch of the threading on the rod 56 and on the nut.

Accordingly in accordance with a preferred embodiment of the present invention, the pitch of the threading on the rod 56 and the nut is selected such that rotation of the manifold causes each of the nozzles 54 to systematically "scan" all of the fluid passage openings on the downstream surface 30, preferably one by one, within a given region, such that all of the nozzles clean all of the fluid passage openings on the downstream surface, as the manifold moves from a raised orientation to the lowered orientation shown in FIG. 1. In accordance with a preferred embodiment of the invention, the pitch of the threading is selected that one full 360 degree rotation of the manifold produces a longitudinal movement of the manifold along axis 26 which is sufficient to move the pressurized fluid stream provided at the outlet of each nozzle to an adjacent fluid passageway along the longitudinal axis.

Reference is now made to FIGS. 2 and 3, which illustrate an alternative version of the apparatus of FIG. 1. Here, in contrast to the embodiment of FIG. 1, threaded rod 56 is replaced by an unthreaded rod 66 and threaded nut 58 is replaced by a bushing 68. Above the manifold and fixedly attached thereto there is provided a threaded rod 70 extending along axis 26 which cooperate with threading 72.

In this embodiment the hand crank 46 rotates a slotted drive member 74 and a transverse pin 76, fixed to the threaded rod 70, is driven in rotation thereby and permitted to freely move longitudinally along axis 26 by virtue of the slot 78 formed in drive member 74.

The principles of operation and the remainder of the structure of the embodiment of FIGS. 2 and 3 are essentially the same as in the embodiment of FIG. 1 and therefore are not be restated here, for the sake of conciseness.

Figure 4:
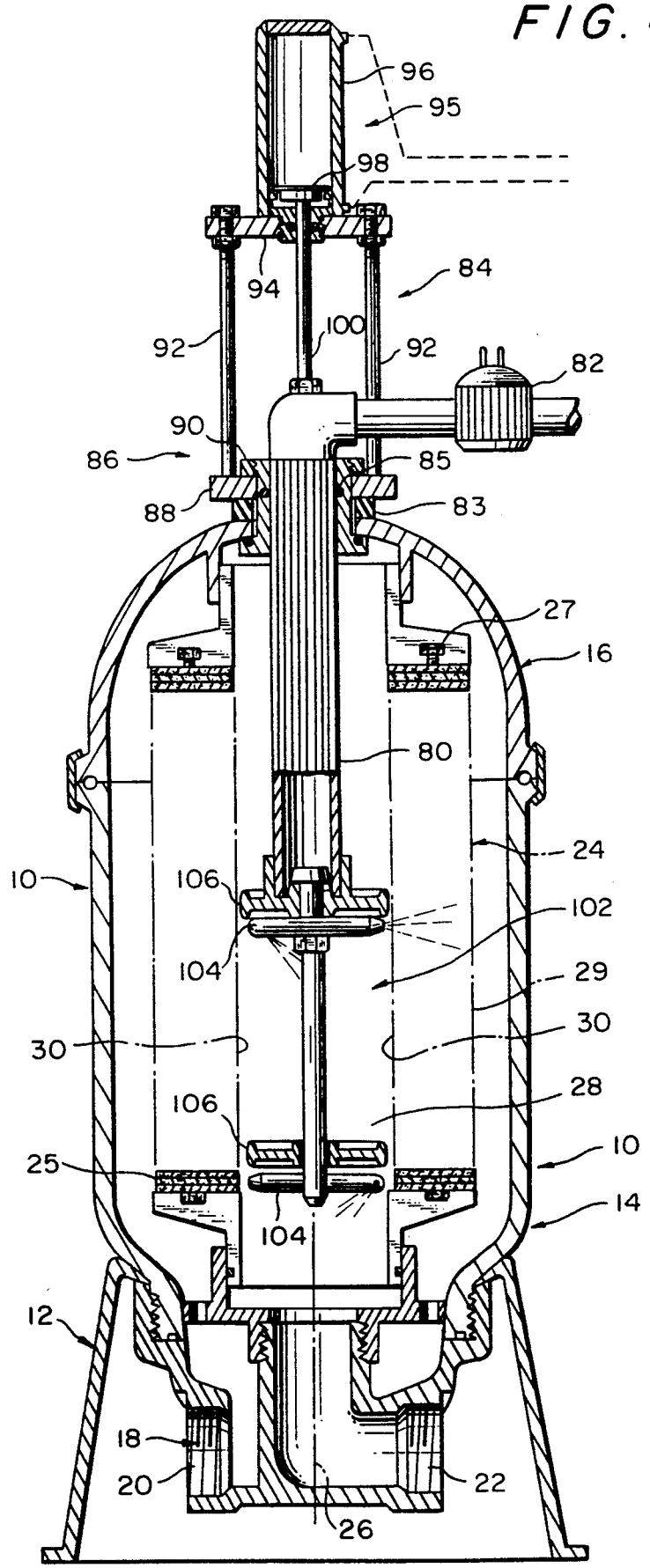
FIG. 4 is a partially cut away illustration of a fluid filter constructed and operative in accordance with another preferred embodiment of the invention having piston operated backflush apparatus, shown in a lowered orientation.

Reference is now made to FIG. 4 which illustrates a filter which is generally the same as that described hereinabove in connection with FIGS. 1-3 but wherein the filter disk cleaning apparatus is different as will be described hereinbelow:

In the embodiment of FIG. 4, the filter disk cleaning apparatus comprises a backflush fluid supply tube 80, which is coupled via an automatically controlled valve 82 to a supply of pressurized backflush fluid, such as water (not shown). Supply tube 80 is slidably mounted with respect to housing 10 for translation along axis 26 via a bushing 83 and a sealing ring 85 mounted therein.

A piston assembly 84 comprises a piston support 86 including a bottom support ring 88 mounted onto the top filter portion 16 by a threaded retaining ring 90, support rods 92 and a piston support platform 94, mounted onto support rods 92.

A piston and cylinder combination 95, of conventional construction which may be hydraulically or otherwise controlled is mounted onto platform 94 and moves supply tube 80 along axis 26. The piston and cylinder combination 95 includes a cylinder 96, a piston 98 and a piston extension 100 which is fixedly coupled to supply tube 80.

Depending from supply tube 80 and rotatably mounted with respect thereto in generally sealing engagement is a water driven nozzle assembly 102, typically including at least one water driven nozzle 104, preferably of the type illustrated in FIGS. 2-3 of applicant's U.S. patent application Ser. No. 07/150,246, the disclosure of which is hereby incorporated by reference.

A pair of nozzle centering members 106 are preferably provided in association with respective nozzles 104.

In the embodiment of FIG. 4, rotation of the nozzles is produced by water power, while translation of the nozzles along axis 26 is produced by operation of piston and cylinder combination 95, which may be controlled by electrical, hydraulic, fluidic or any other suitable means, which may also control the operation of valve 82 in coordination therewith.

Figure 5A:
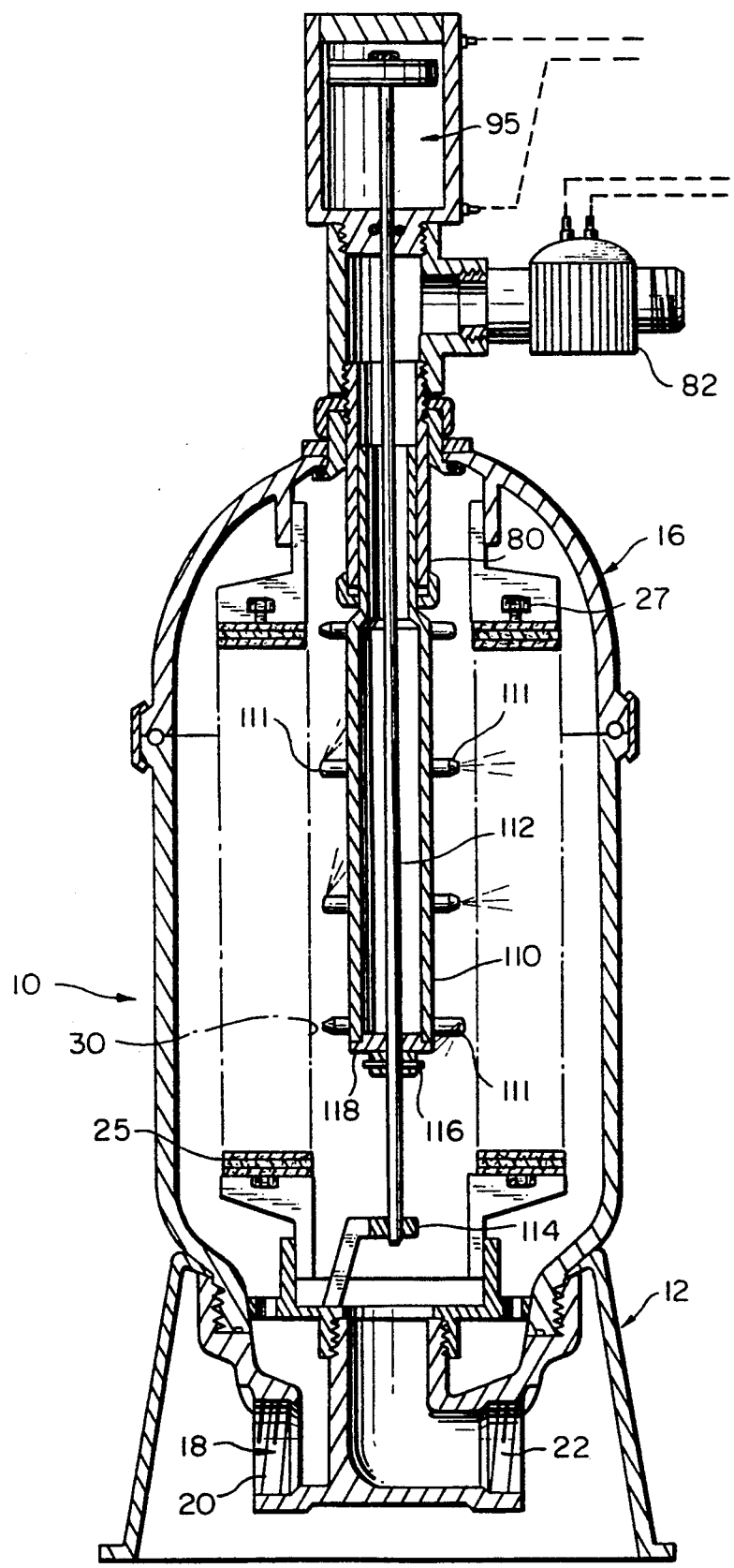
FIG. 5A is a partially cut away illustration of a fluid filter constructed and operative in accordance with yet another preferred embodiment of the invention having piston operated backflush apparatus, shown in a raised orientation.
Figure 5B:
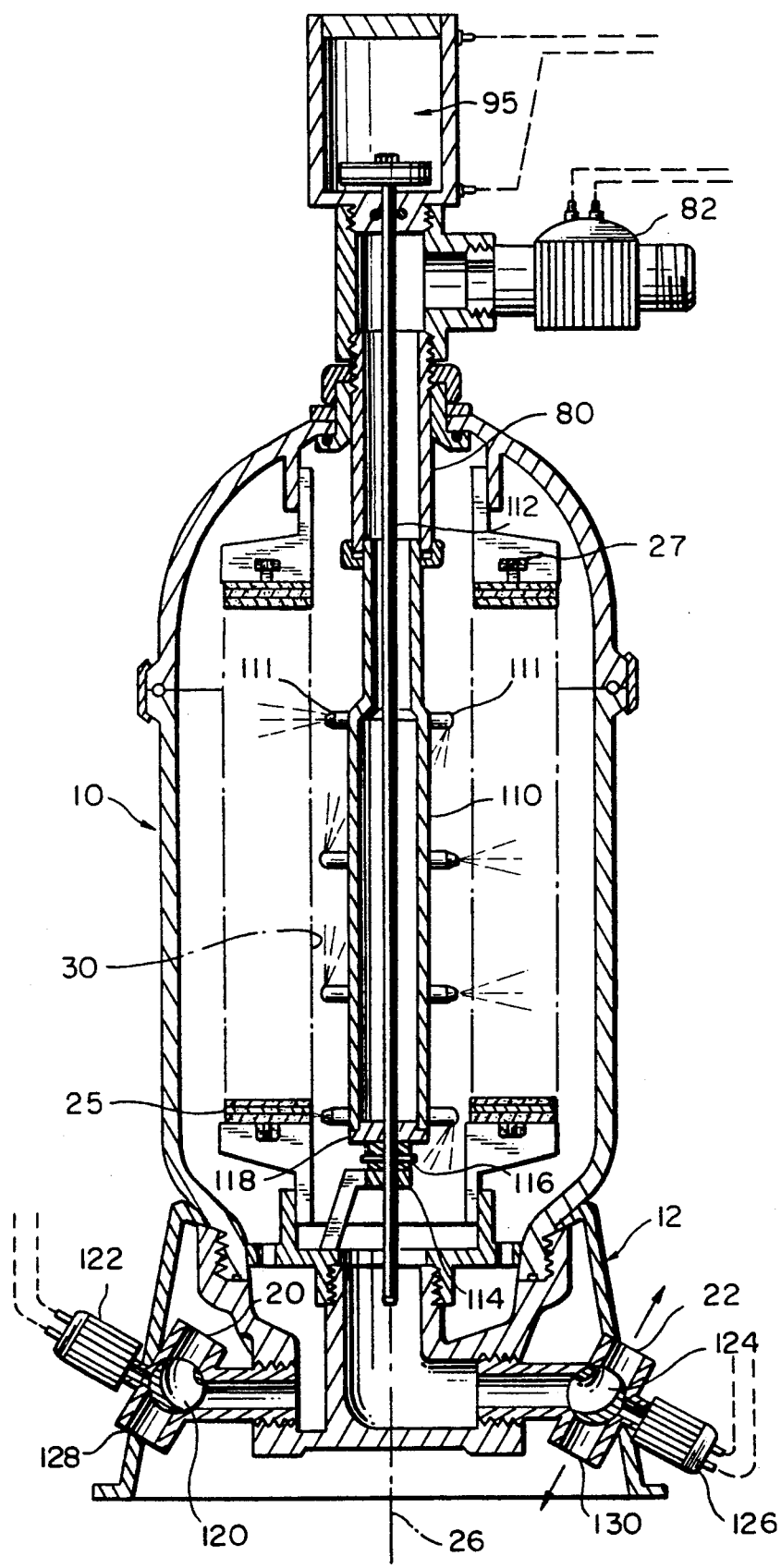
FIG. 5B is a partially cut away illustration of a fluid filter constructed and operative in accordance with yet a further preferred embodiment of the invention having piston operated backflush apparatus, shown in a lowered orientation.

Reference is now made to FIGS. 5A and 5B, which illustrate variations of the embodiment of FIG. 4. In these embodiments, the nozzle assembly 102 is replaced by a nozzle manifold 110 which is both rotatably and axially displaceable and in sealing engagement with the supply pipe 80, which is fixed with respect to the housing and which has a plurality of nozzles 111 mounted thereon, including radially directed nozzles for cleaning of the filter disks and non-radially directed nozzles.

A piston extension rod 112 extends through the interior of the supply pipe 80 and of the manifold 110 and slidably extends through a bushing 114, fixedly mounted with respect to the housing 10. A washer 116 is fixedly mounted onto extension rod 114 and serves to engage a bottom surface 118 of the manifold 110, such that when the piston is raised, as illustrated in FIG. 5A, the engagement of washer 116 with bottom surface 118 causes the manifold to be raised along axis 26. Rotation of manifold 110 is produced by the action of the non-radially directed nozzles and movement of the entire manifold and the nozzles 111 is produced by piston and cylinder combination 95. Suitable control of the operation of piston and cylinder combination 95 produces scanning of the entire downstream surface of the filter and generally complete cleaning of the filter.

In the embodiment of FIG. 5B there is additionally provided a first automatic valve assembly comprising a valve 120 and valve control means 122 and a second automatic valve assembly comprising a valve 124 and valve control means 126. The first and second valve assemblies are associated with the inlet 20 and the outlet 22 respectively and also with respective drain outlets 128 and 130 respectively. Drain outlet 128 is operative to drain the filter of fluid to be filtered. Drain outlet 130 is operative to drain the filter of backwashing fluid. The valves 120 and 124 may be hydraulically, electrically or pneumatically controlled.

Figure 6:
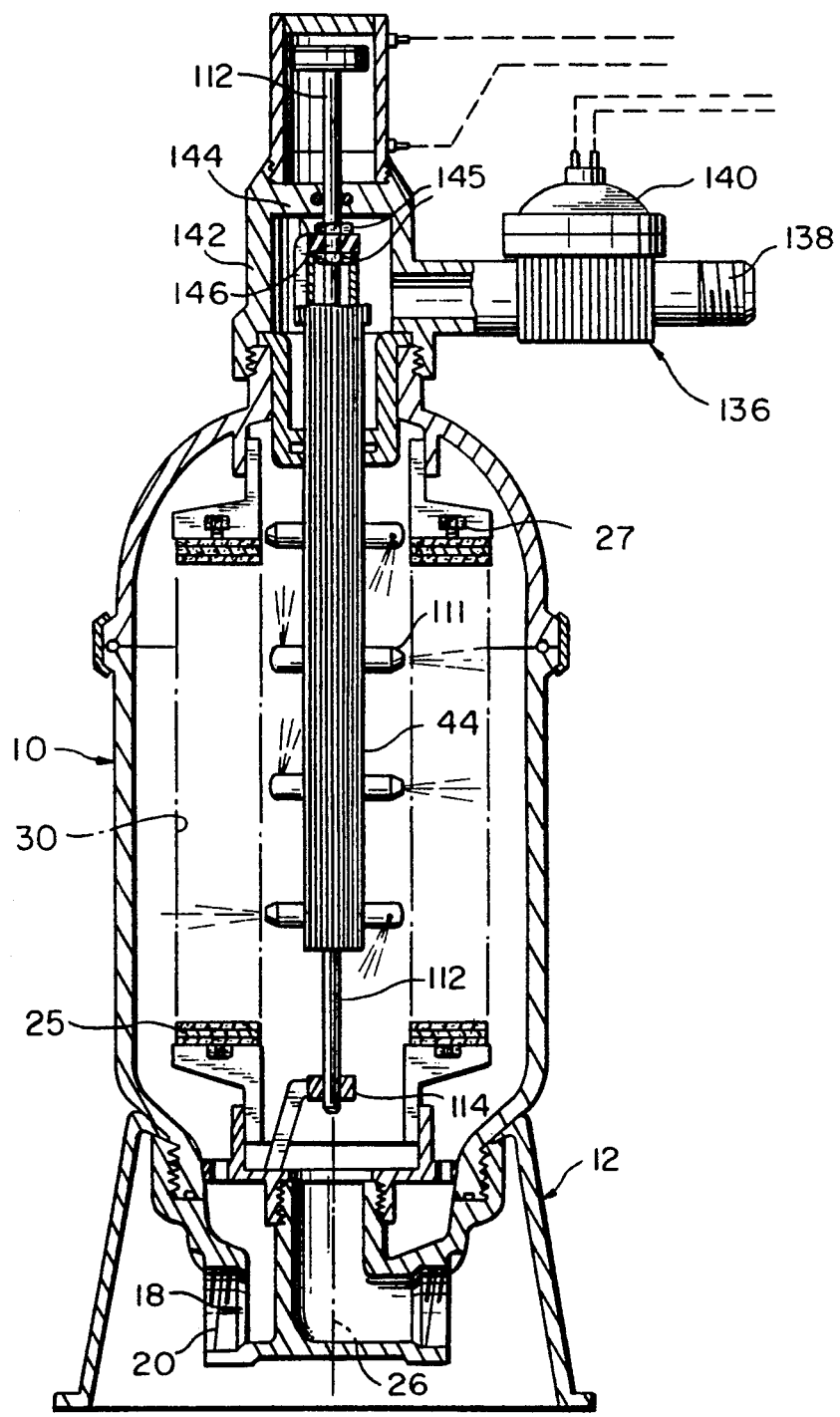
FIG. 6 is a partially cut away illustration of a fluid filter constructed and operative in accordance with still another preferred embodiment of the invention having piston operated backflush apparatus, shown in a raised orientation.

Reference is now made to FIG. 6, which illustrates a variation of the apparatus of FIG. 5A having two essential differences therefrom. Firstly, the backflush fluid is supplied to the manifold 44 via a backflush fluid supply assembly 136, similar to the fluid supply assembly 36 described in connection with FIG. 1. The assembly 136 comprises a fluid supply pipe 138, receiving a backflush fluid, such as water, under pressure from a suitable source, not shown, an automatically actuable valve 140 for controlling the supply of backflush fluid along supply pipe 138 and a sealed collar member 142, which threadably and sealingly engages the top portion of housing 10.

Secondly, the piston extension rod 112 is rotatably connected to manifold 44 as by a bushing assembly 144. The bushing assembly 144 comprises a pair of nuts 145 and a sleeve member 146 arranged along the axis, between the nuts 145. The components of the bushing assembly are arranged to enable relatively free water driven rotation of the manifold 44 and of the associated nozzles by virtue of the eccentric water flows produced by some of the nozzles, while permitting the axial orientation of the manifold 44 to be determined by the position of the piston in the cylinder.

Figure 7:
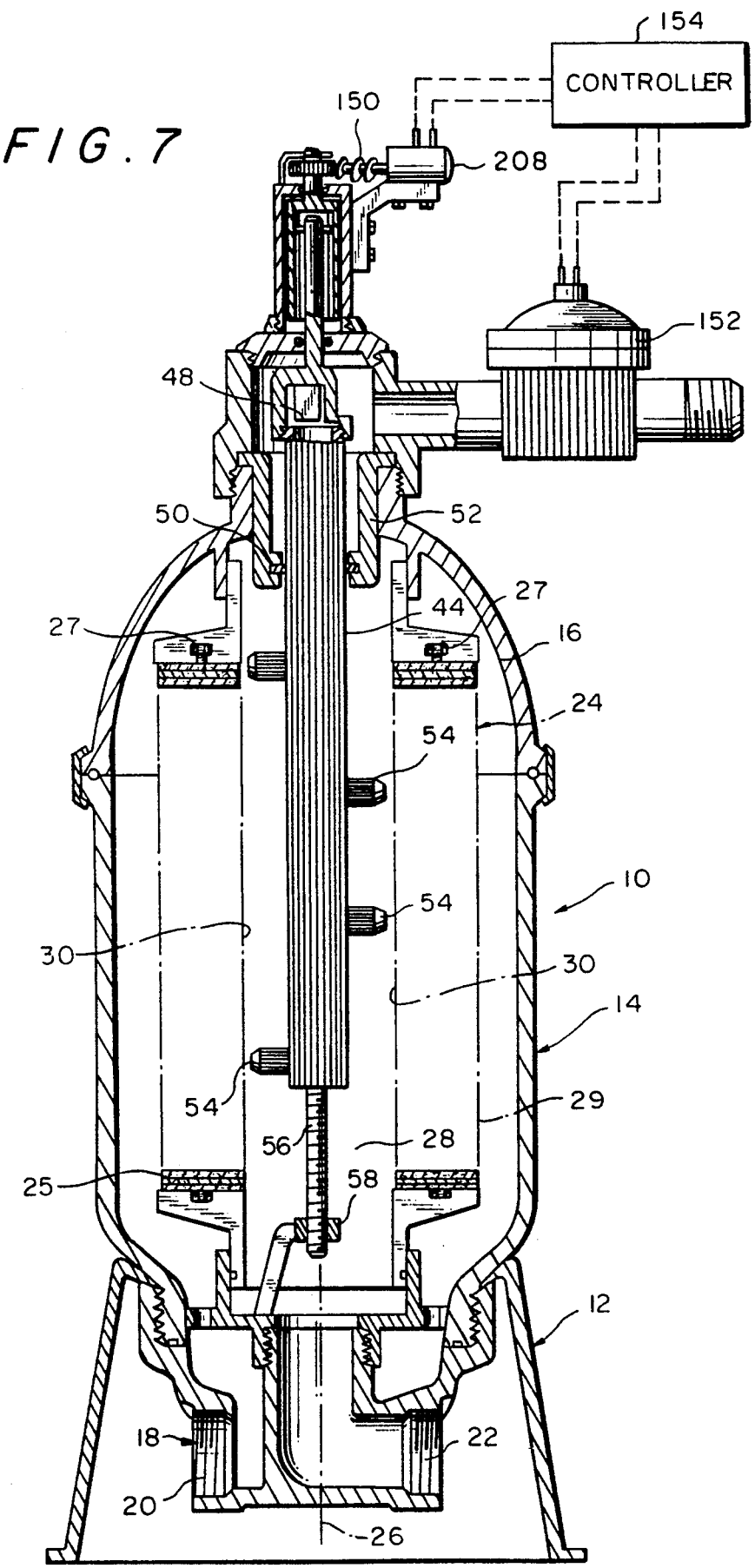
FIG. 7 is a partially cut away illustration of a fluid filter constructed and operative in accordance with yet another preferred embodiment of the invention having electric motor operated backflush apparatus, shown in a raised orientation.

Reference is now made to FIG. 7, which illustrates a motor powered version of the apparatus of FIG. 2. In the embodiment of FIG. 7, the hand crank is replaced by a conventional electric motor driven gear drive. The manually operable backflush fluid supply valve in the embodiment of FIG. 2 is here replaced by an automatically controllable valve 152. Both the electric motor driven gear drive and the valve 152 are typically controlled and coordinated by a conventional controller 154 or alternatively by a microprocessor or conventional switch arrangement, as most suitable. The unthreaded rod 66 and bushing 68 are replaced by threaded rod 56 and threaded nut 58 respectively as in FIG. 1.

Figure 8A:
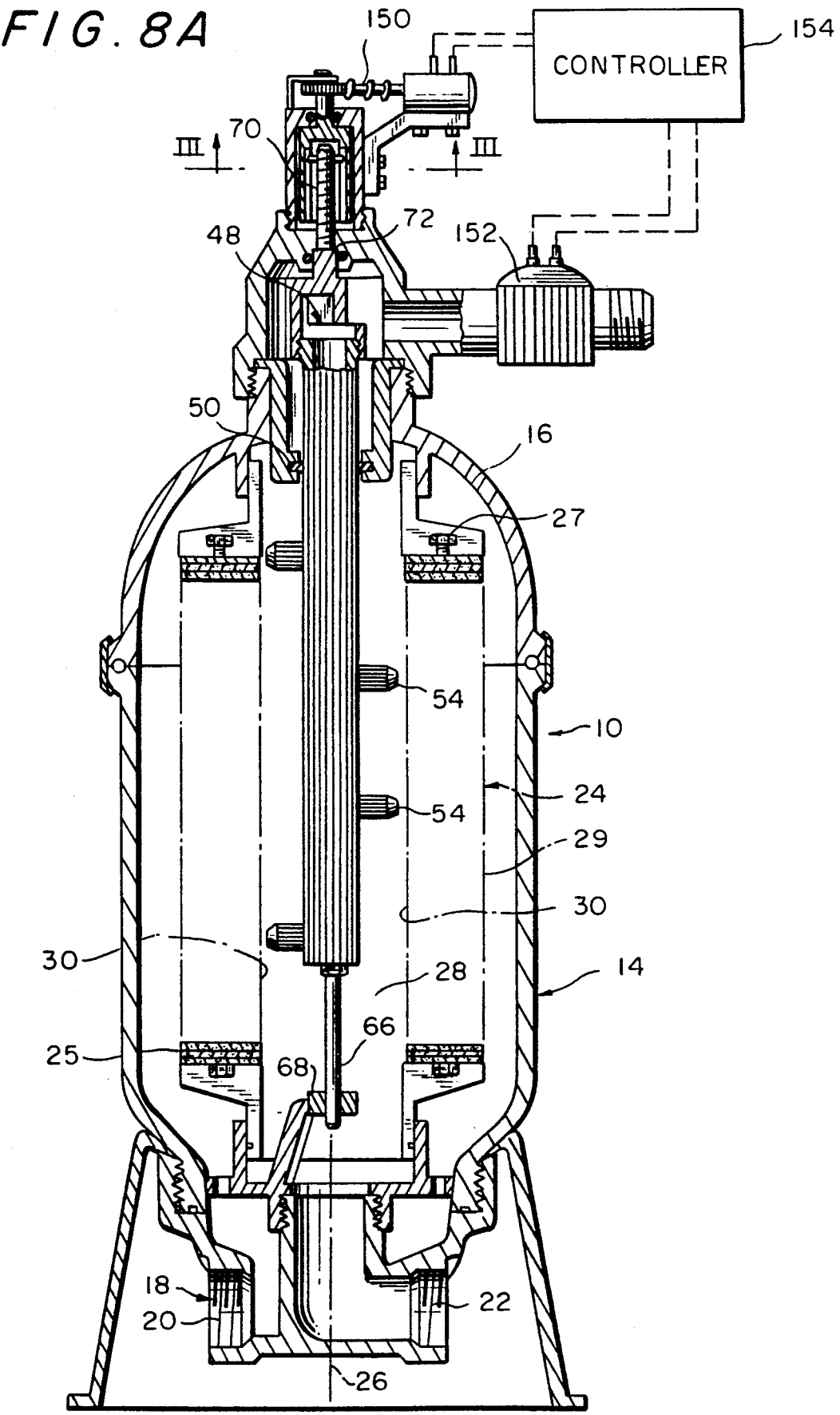
FIGS. 8A and 8B are partially cut away illustrations of a fluid filter constructed and operative in accordance with still another preferred embodiment of the invention having electric motor operated backflush apparatus, shown in respective raised and lowered orientations.
Figure 8B:
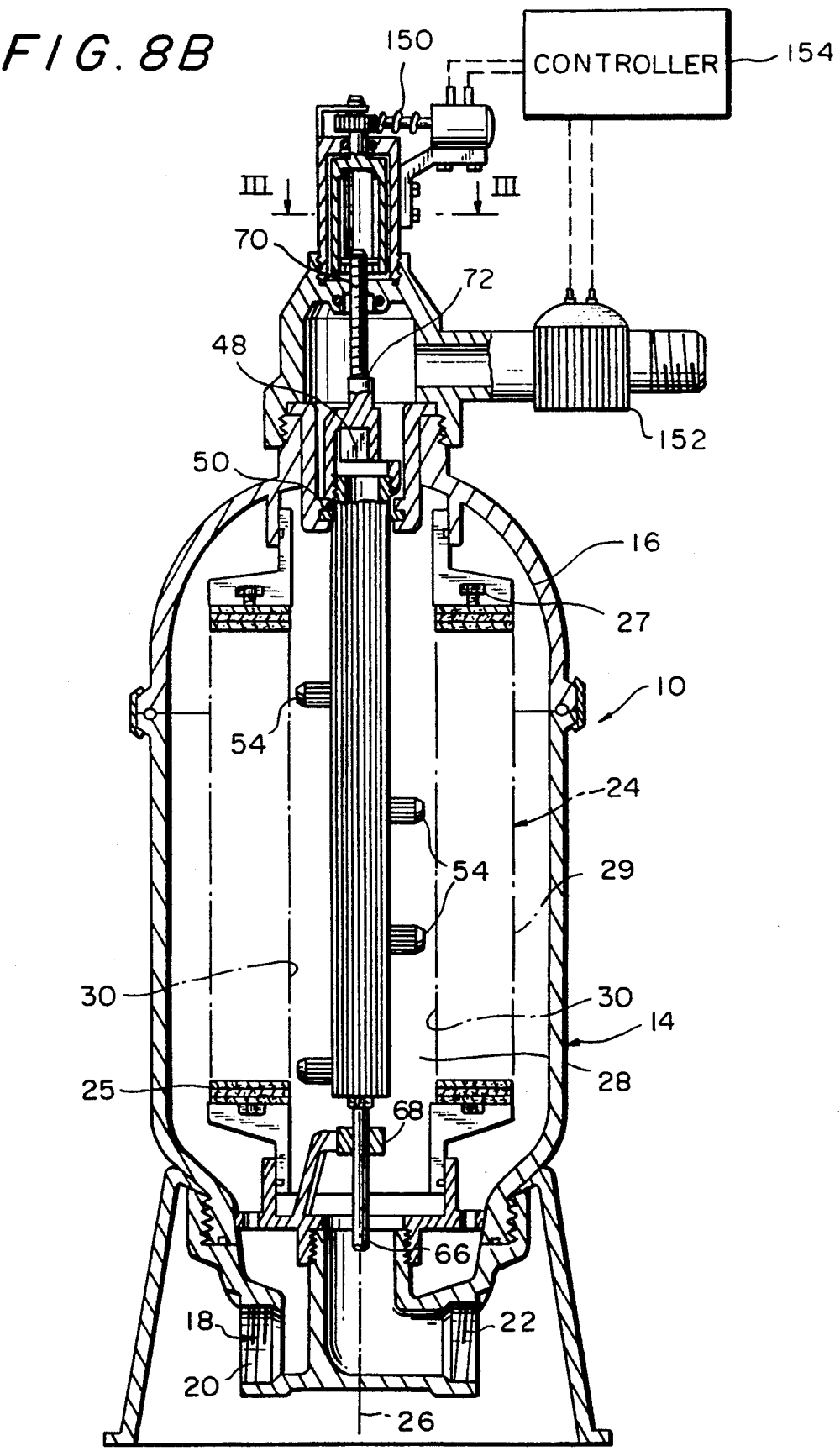
Figure 7:
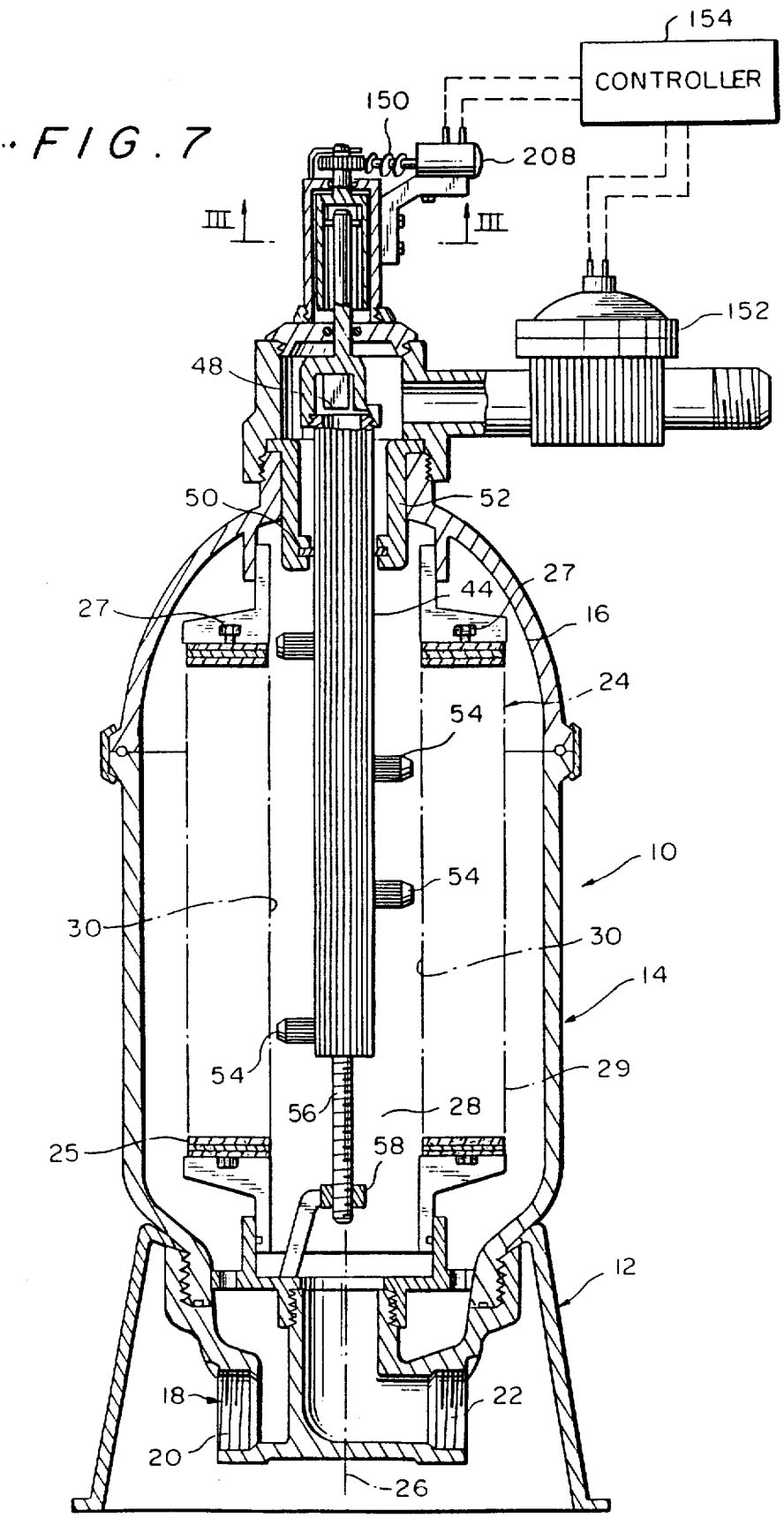

Reference is now made to FIGS. 8A and 8B, which illustrates a variation of the embodiment of FIG. 7. Here, as in FIG. 2 but in contrast to the embodiment of FIG. 7, threaded rod 56 is replaced by an unthreaded rod 66 and threaded nut 58 is replaced by a bushing 68. Above the manifold and fixedly attached thereto there is provided a threaded rod 70 extending along axis 26 which cooperates with a threaded nut 72. In this embodiment the motor driven gear drive 150 rotates a slotted drive member 74 (FIG. 3) and a transverse pin 76, fixed to the threaded rod 70, is driven in rotation thereby and permitted to freely move longitudinally along axis 26 by virtue of the slot 78 formed in drive member 74.

The principles of operation and the remainder of the structure of the embodiment of FIGS. 8A and 8B are essentially the same as in the embodiment of FIGS. 1A and 1B and FIG. 2 and therefore are not restated here, for the sake of conciseness.

Reference is now made to FIGS. 9A-9B, which illustrate a further alternative embodiment of the invention, wherein one or more nozzles 160 with elongate outlets are mounted onto a manifold 162. The elongate nozzle outlets provide "scanning" of the entire downstream surface of the filter stack and thus longitudinal movement of the manifold along axis 26 is not required.

The cleaning unit comprises a cleaning unit housing 205 and a rod 215, supported by a sleeve 201, mounted interiorly and axially with respect to the housing of the cleaning unit. A connecting pin 203 connects the rod 215 to the cleaning unit housing. A valve 207 in fluid communication with a supply of backflush fluid under pressure (not shown) controls supply of fluid to supply pipe 210 and hence to the rotating cleaning unit. Valve 207 may be electrically or pneumatically controlled, or may alternatively be controlled in any other suitable manner. Preferably, valve 207 as well as a motor 208 are controlled and coordinated by a conventional controller 154, as shown, or alternatively by a microprocessor or conventional switch arrangement as most suitable. A seal 206 provides sealing engagement between the rotating cleaning unit and the supply pipe 210. The electrical motor 208 drives a gear 211 via a wheel screw 209. The gear 211 drives the rod 215 and is fixedly mounted thereupon by means of a pin 212.

To clean the filter shown and described in FIGS. 9A-9B, the filter is first emptied via the inlet 20. Valve 207 is then opened, thereby causing fluid under pressure to flow into the supply pipe 210 and then into the interior of the cleaning unit 205. The fluid is forced out of the elongate nozzle outlets and the resultant jets of fluid dislodge the particles from the filter. The electrical motor 208 is operative to rotate the rod 215 about the axis 226 of the filter. The rod 215 and the cleaning unit rotate, thereby allowing the elongate nozzle outlets to scan substantially the entire azimuth of the filter.

FIGS. 10A-10B show an embodiment which is a variation of the embodiment of FIGS. 9A-9B. The embodiment of FIGS. 10A-10B is generally the same as the embodiment of FIGS. 9A-9B but with the following differences: there is provided an impeller 224 inside a generally cylindrical impeller housing 222 comprising a bottom portion 221 and a cover 223. The housing 222 is sealably engaged with the supply pipe 210, as by threading 221. The impeller is in fluid communication with the valve 207 via a pipe 227 which is preferably arranged eccentrically t the generally cylindrical impeller housing 222. The impeller is drivingly associated with the rod 215 by means of a pin 225.

When it is desired to clean the filter, the valve 207 is opened and backflush fluid under pressure enters the cleaning unit 205. The fluid impinges upon the blades of the impeller 224 and rotates the impeller and the associated rod 215, thereby causing rotation of the entire cleaning unit.

The remainder of the structure of the embodiments of FIGS. 9A-10B are essentially the same as in the previous embodiments and therefore are not restated here, for the sake of conciseness.

It will be appreciated by persons skilled in the art that the present invention is no limited by what has been particularly shown and described hereinabove. Rather the scope of the present invention is defined only by the claims which follow:

I claim:

1. A cleanable filter system, comprising:
   a housing having an inlet for fluid to be filtered and an outlet for filtered fluid;
   a filter member disposed within said housing between said inlet and said outlet, said filter member having a central bore communicating with the outlet and an outer circumference communicating with the inlet;
   a movable elongated hollow member disposed along the central bore of said filter member and having a plurality of fluid passages located at linearly separated locations along said elongated hollow member, one end of said elongated hollow member being in communication with a source of pressurized fluid; and
   motion providing and pressurized fluid containing means, connected to said hollow member, for providing motion to move said hollow member linearly and rotationally such that substantially every point on the central bore of said filter member receives pressurized fluid impinged thereon from at least one of said fluid passages when said means is in operation.

2. A system in accordance with claim 1, wherein said motion providing means comprises rotating means for providing rotational movement to aid elongated hollow member and screw means for providing linear motion to said elongated hollow member, thus enabling combined rotational and linear movement of the elongated hollow member when in operation.

3. A system in accordance with claim 2, wherein said rotating means is manually operated.

4. A system in accordance with claim 2, wherein said rotating means is a motor.

5. A system in accordance with claim 1, wherein said motion providing means comprises a screwshaft connected to one end of said elongated hollow member, said screwshaft having a protrusion thereon, a part connected to said housing in threaded engagement with said screwshaft, a sleeve surrounding said screwshaft and having a linear slit for receiving said protrusion of said screwshaft, and rotating means for causing said sleeve to rotate and thereby impart rotating motion through said protrusion to said screwshaft, whereby, due to the threaded engagement of said screwshaft with said part, linear motion is also imparted to said elongated hollow member and said protrusion slides linearly within said slit on said sleeve during said linear motion.

6. A system in accordance with claim 5, wherein said rotating means is manually operated.

7. A system in accordance with claim 5, wherein said rotating means is a motor.

8. A system in accordance with claim 1, wherein said motion providing means comprises linear movement means for causing said elongated member to move linearly and at least one passage connected to said elongated member for imparting rotational movement onto said elongated member when pressurized fluid is forced therethrough.

9. A system in accordance with claim 1, wherein said filter member is constructed of a plurality of filter discs.

10. A system in accordance with claim 1, wherein said filter member is constructed of a stack of filter discs, at least some of said filter discs being of finger shape on their outer circumferences.

11. A cleanable filter system, comprising:
    a housing having an inlet for fluid to be filtered and an outlet for filtered fluid;
    a filter member disposed within said housing between said inlet and said outlet, said filter member having a central bore communicating with the outlet and an outer circumference communicating with the inlet;
    a movable elongated hollow member disposed along the central bore of said filter member and having a plurality of linearly elongated nozzle outlets located along said elongated hollow member, one end of said elongated hollow member being in communication with a source of pressurized fluid, wherein said elongated nozzle outlets are not substantially overlapping and together are directed to cause pressurized fluid to impinge upon the entire linear length of the central bore of said filter member; and
    motion providing and pressurized fluid containing means, connected to said hollow member, for providing rotational motion to said hollow member, such that, during operation of said means, said hollow member rotates and substantially every point on the central bore of said filter member receives fluid impinged thereon from at least one of said elongated nozzle outlets.

12. A system in accordance with claim 11, wherein said motion providing means comprises a box connected to said housing having a tangential inlet connected to a source of pressurized fluid and an outlet, an impeller disposed within said box such that the tangential entry of pressurized fluid causes rotation of said impeller, and transmission means for transmitting the rotational motion of said impeller to said elongated hollow member.

13. A system in accordance with claim 12, wherein the outlet of said box is connected to the interior of said elongated hollow member, whereby the pressurized fluid entering through the tangential inlet of said box activates said impeller to a rotational motion, passes through the outlet of said box into the interior of said elongated hollow member and exits in the form of pressurized jets through the plurality of elongated nozzle outlets located on said elongated hollow member for cleaning the filter member.

14. A system in accordance with claim 11, wherein said motion providing means is connected to said elongated hollow member by a rigid elongated shaft for transferring rotational motion to the elongated hollow member during operation.

15. A system in accordance with claim 14, wherein said motion providing means comprises a motor.

16. A system in accordance with claim 11, wherein said filter member is constructed of a plurality of filter discs.

17. A system in accordance with claim 11, wherein said filter member is constructed of a stack of filter discs, at least some of said filter discs being of finger shape on their outer circumferences.

* * * * *

UNITED STATES PATENT AND TRADEMARK OFFICE
CERTIFICATE OF CORRECTION

PATENT NO. : 5,228,993
DATED : Jul. 20, 1993
INVENTOR(S) : Mordeki DRORI

Page 1 of 3

It is certified that error appears in the above-indentified patent and that said Letters Patent is hereby corrected as shown below:

On the title page: Item [19], delete "Dori" and insert therefore --Drori--;

Item [76] delete "Mordeki Dori" and insert therefore --Mordeki Drori--;

Column 1, line 63, delete "a" and insert therefore --an--;

Delete Figure 7, and insert therefore the attached Figure 7;

Column 5, line 28, delete "114" and insert therefore --112--;

Column 7, line 18, delete "221" and insert therefore --221A--;

Column 7, line 20, delete "t" and inset therefore --to--; and

Claim 2, line 3, delete "aid" and insert therefore --said--.

UNITED STATES PATENT AND TRADEMARK OFFICE
CERTIFICATE OF CORRECTION

PATENT NO. : 5,228,993
DATED : July 20, 1993
INVENTOR(S) : Mordeki DRORI

It is certified that error appears in the above-indentified patent and that said Letters Patent is hereby corrected as shown below:

Column 7, line 18, delete "221" and insert therefore --221A--.

Column 7, line 20, delete "t"and inset therefore --to--, and

Column 7, line 64, delete "aid" and insert therefore --said --.

Signed and Sealed this

Twelfth Day of April, 1994

*Attest:*

BRUCE LEHMAN

*Attesting Officer*  *Commissioner of Patents and Trademarks*